(12) United States Patent
Zhang et al.

(10) Patent No.: US 9,387,626 B2
(45) Date of Patent: Jul. 12, 2016

(54) FIBER REINFORCED COMPOSITES MADE WITH COUPLING-ACTIVATOR TREATED FIBERS AND ACTIVATOR CONTAINING REACTIVE RESIN

(71) Applicant: JOHNS MANVILLE, Denver, CO (US)

(72) Inventors: Mingfu Zhang, Highlands Ranch, CO (US); Klaus Friedrich Gleich, Highlands Ranch, CO (US); Asheber Yohannes, Littleton, CO (US); Michael John Block, Centennial, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 614 days.

(21) Appl. No.: 13/788,857

(22) Filed: Mar. 7, 2013

(65) Prior Publication Data

US 2014/0256201 A1 Sep. 11, 2014

(51) Int. Cl.
*B29C 70/06* (2006.01)
*B29C 70/16* (2006.01)
(Continued)

(52) U.S. Cl.
CPC .............. *B29C 70/06* (2013.01); *B29C 67/246* (2013.01); *B29C 70/16* (2013.01); *B29C 70/18* (2013.01);
(Continued)

(58) Field of Classification Search
None
See application file for complete search history.

(56) References Cited

U.S. PATENT DOCUMENTS 3,621,001 A * 11/1971 Steinhofer .............. C08G 69/20
528/315
4,188,478 A * 2/1980 Goebel, Jr. .............. C08G 69/18
528/314
(Continued)

FOREIGN PATENT DOCUMENTS

| EP | 2 184 267 A1 | 5/2010 |
|---|---|---|
| WO | 2011/151710 A2 | 12/2011 |
| WO | 2013/102590 A1 | 7/2013 |

OTHER PUBLICATIONS

Cinquin et al, "Characterization of a thermoplastic (polyamide 66) reinforced with unidirectional glass fibres. Matrix additives and fibres surface treatment influence on the mechanical and viscoelastic properties", Composites, Mar. 1, 1990, pp. 141-147, vol. 21, No. 2, IPC Business Press Ltd., Haywards Heath, GB.
(Continued)

*Primary Examiner* — Benjamin Schiffman
(74) *Attorney, Agent, or Firm* — Robert D. Touslee

(57) ABSTRACT

This invention relates to a process of making a fiber-reinforced composite. Glass fibers may be provided. These glass fibers may be treated with a sizing composition that has a coupling-activator compound with the formula: $S—X-(A)_n$, where S represents a silicon-containing coupling moiety capable of bonding to the surface of glass fibers, X represents a linking moiety, and $(A)_n$ represents one or more polymerization activator moieties. The treated glass fibers may be combined with a resin to make a fiber-resin mixture. The resin may have a monomer, a catalyst, and an activator compound capable of initiating a polymerization of the monomer. The monomer may be a lactam or lactone having 3-12 carbon atoms in the main ring. The fiber-resin mixture may then be cured so that the monomer polymerizes to form a thermoplastic polymer matrix of the fiber-reinforced composite. The thermoplastic polymer matrix may be formed by in situ polymerization initiated from both the surface of the glass fibers and the resin. The fiber-reinforced composite formed may be at least 70 wt. % glass fiber.

22 Claims, 2 Drawing Sheets

(51) Int. Cl.
*B29C 70/18* (2006.01)
*C08K 7/14* (2006.01)
*C08L 77/02* (2006.01)
*B29C 67/24* (2006.01)
*C08J 5/04* (2006.01)
*C08J 5/08* (2006.01)
*B29C 70/48* (2006.01)
*C08G 69/18* (2006.01)
*B29K 77/00* (2006.01)

(52) U.S. Cl.
CPC .............. *B29C 70/48* (2013.01); *C08G 69/18* (2013.01); *C08J 5/043* (2013.01); *C08J 5/08* (2013.01); *C08K 7/14* (2013.01); *C08L 77/02* (2013.01); *B29K 2077/00* (2013.01); *C08J 2367/04* (2013.01); *C08J 2377/02* (2013.01); *Y10T 428/249921* (2015.04); *Y10T 442/30* (2015.04)

(56) References Cited

U.S. PATENT DOCUMENTS

| | | | | |
|---|---|---|---|---|
| 4,697,009 | A * | 9/1987 | Deschler | C07F 7/182 540/487 |
| 5,864,007 | A * | 1/1999 | Schmid | C08G 69/20 528/312 |
| 6,579,965 | B2 * | 6/2003 | Hoogen | C08G 69/20 264/143 |
| 8,293,322 | B2 * | 10/2012 | Burghardt | B29C 47/0004 427/214 |
| 8,378,094 | B2 * | 2/2013 | Shooshtari | C03C 25/18 540/487 |
| 8,791,203 | B2 * | 7/2014 | Tadepalli | C08G 69/04 428/300.1 |
| 2010/0305269 | A1 * | 12/2010 | Gleich | B29C 70/545 524/606 |
| 2011/0045275 | A1 * | 2/2011 | Tadepalli | C07F 7/1836 428/300.1 |
| 2011/0180957 | A1 * | 7/2011 | Burghardt | B29C 47/0004 264/211.24 |
| 2013/0161859 | A1 * | 6/2013 | Shooshtari | C08F 292/00 264/171.13 |
| 2013/0164449 | A1 * | 6/2013 | Tadepalli | C08G 69/08 427/322 |
| 2013/0165585 | A1 * | 6/2013 | Tadepalli | C08J 5/24 524/606 |

OTHER PUBLICATIONS

Van Rijswijk et al, "Reactive processing of textile fiber-reinforced thermoplastic composites—An overview", Composites Part A: Applied Science and Manufacturing, Dec. 15, 2006, pp. 666-681, vol. 38, No. 3, Elsevier Science Publishers B.V., Amsterdam, NL.

\* cited by examiner

FIBER REINFORCED COMPOSITES MADE WITH COUPLING-ACTIVATOR TREATED FIBERS AND ACTIVATOR CONTAINING REACTIVE RESIN

CROSS-REFERENCES TO RELATED APPLICATIONS

The technology disclosed herein is related to the following: U.S. patent application Ser. No. 12/008,041 (filed Jan. 8, 2008, published Nov. 11, 2010), Ser. No. 12/724,024 (filed Mar. 15, 2010, published Nov. 4, 2010), Ser. No. 12/881,736 (filed Sep. 14, 2010, published Jan. 27, 2011), Ser. No. 12/913,326 (filed Oct. 27, 2010, published Feb. 24, 2011), Ser. No. 13/083,331 (filed Apr. 8, 2011, published Jul. 28, 2011), Ser. No. 13/335,813 (filed Dec. 22, 2011), Ser. No. 13/335,690 (filed Dec. 22, 2011), Ser. No. 13/335,761 (filed Dec. 22, 2011), and Ser. No. 13/335,793 (filed Dec. 22, 2011). All of which are herein incorporated by reference for all purposes.

BACKGROUND OF THE INVENTION

Inorganic materials are often incorporated in composite articles to affect physical properties. In addition to increased dimensional stability, the inorganic material may improve the physical and mechanical properties of polymer composites. As one example, glass fibers may be placed into a polymer matrix to affect the strength of the composite. The high tensile strength of glass fibers may cause the composite to become more rigid. In order to improve the interfacial adhesion between glass fibers and the polymer matrix, glass fibers may be treated with a sizing composition after they are drawn from a bushing. Chemical bonding between glass fibers and the polymer matrix affects the mechanical properties and the aging performance of composite materials. However, the degree of chemical bonding at the glass-polymer interface may need to be adjusted to balance between various composite properties, including mechanical strength and fracture toughness. This and other needs are addressed in the present application.

BRIEF SUMMARY OF THE INVENTION

Fiber-reinforced composites are suitable for a variety of applications. Such applications may prefer fiber-reinforced composites with properties such as high tensile strength, interlaminar shear strength, and flexural strength. These stronger composites may be achieved through increasing the weight percentage of glass fibers in the composite. Chopped fiber-reinforced composites, however, typically contain less than 50 wt. % glass fiber. This limit is partly a result of the difficulty in mixing highly viscous resins with a high amount of chopped fibers. Another way to affect the strength properties of a fiber-reinforced composite is through the covalent bonding between the fibers and the polymer matrix. Coupling-activator (C-A) compounds may aid in binding polymers, such as polyamide-6, to the fibers and increase the strength of the final composite. However, the concentration of these C-A compounds should balance the positive effects of binding the polymers to the fibers with potentially negative effects of creating too many initiation points on the fiber surface and also reducing fracture toughness. The present application recognizes that increasing the strength of a composite by loading in more chopped fibers or further increasing the C-A compounds in the binder resin eventually faces technical obstacles.

Novel methods that increase the fiber content and enable tuning the fiber-matrix interfacial strength allow for more flexibility in affecting the strength properties of fiber-reinforced composites. Replacing some or all of the chopped fibers with continuous fibers improves composite mechanical properties. Reactive resin systems, such as polyamide-6 formed by the anionic ring-opening polymerization of caprolactam, overcome limitations in mixing highly viscous resins by starting with low-viscosity monomers and then forming a polymer matrix through in situ polymerization in the presence of fiber reinforcement. Reactive resins may then enable higher fiber content in the composite, resulting in improved mechanical properties of the composite articles. The use of reactive resins permits glass fiber concentrations in the composite of about 70 wt. % or more. The use of continuous fibers may increase the strength of the composite above the practical limits that can be achieved in composites that exclusively use chopped fibers.

For reactive resin systems, such as polyamide-6 formed by anionic polymerization of caprolactam, the activator compounds may be added to both the resin and the fibers in a proportion adjusted to affect the mechanical properties in the fiber-reinforced composite. The activator compound added to the resin may be different from that added to the fibers. For example, the activator compound on glass fibers may be a coupling-activator, which may covalently bond to glass fibers through its coupling moiety. The activator compound in the resin may be an activator without a coupling moiety or may be a different type of activator. Fracture toughness may be increased by decreasing the amount of coupling-activator compound applied to the fiber, and this decrease in the amount of activator may be offset by increasing activator in the resin. The ratio of the activator in the resin to the activator on the fiber may be tuned for a desired strength and fracture toughness of the final fiber-reinforced composite.

Embodiments of the invention that may include processes of making a fiber-reinforced composite are described. Exemplary fibers used in the composites may include glass fibers. These glass fibers may be treated with a sizing composition that has a coupling-activator compound with the formula:

$$S-X-(A)_n, \qquad (I)$$

where S represents a silicon-containing coupling moiety capable of bonding to the surface of glass fibers, X represents a linking moiety, and $(A)_n$ represents one or more polymerization activator moieties. The treated glass fibers may be combined with a reactive resin to make a fiber-resin mixture. The resin may have a monomer, a catalyst, and an activator compound capable of initiating a polymerization of the monomer. The monomer may be a lactam or lactone having 3-12 carbon atoms in the main ring. The catalyst in the resin may include a salt of lactam, and the salt may be an alkali metal salt or an alkali-earth metal salt. The fiber-resin mixture may then be cured so that the monomer polymerizes to form a polymer matrix of the fiber-reinforced composite. The fiber-reinforced composite formed may contain at least 70 wt. % glass fiber.

The glass fibers in the fiber reinforced composite may range from about 70 wt. % to 90 wt. %. These glass fibers may include continuous glass fibers. The ratio of the moles of the activator moiety on treated fiber to the moles of the activator moiety in the resin may be between 0.02 to 20.

The activator moiety $(A)_n$ may include a $C_1$ to $C_9$, substituted or unsubstituted, organo-cyclic ring. The organo-cyclic ring may have at least one heteroatom that is a nitrogen or oxygen atom. The organo-cyclic ring may have the following formula:

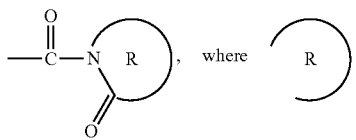

represents a $C_3$, to $C_{12}$, substituted or unsubstituted cyclic hydrocarbon chain. For example, R may be a $C_6$ hydrocarbon chain, so that the activator moiety has the formula:

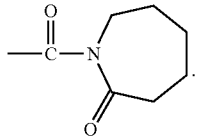

The linking moiety X may include an atom that connects X to one or more activator moieties $(A)_n$, where the atom is not a nitrogen atom.

The fibers may be arranged as a mono-axial and/or multi-axial, woven and/or non-woven, continuous and/or chopped strand mat. The mats may have multiple sections with different weave styles, as well as combinations of woven and non-woven, continuous and/or chopped sections.

This technology may be used in a variety of processes such as resin transfer molding (RTM), reaction injection molding (RIM), reactive extrusion, filament winding, pultrusion, casting (including rotational casting), prepreg processes (including double belt press), rotational molding, blow molding, D-LFT processes, D-SMC processes, processes to produce organo sheets, and other types of prepregs (reactive and already reacted ones).

Embodiments of the invention may also include glass fibers treated with a sizing composition that has a coupling-activator compound having the formula: S—X-$(A)_n$, where S represents a silicon-containing coupling moiety capable of bonding to the surface of glass fibers, X represents a linking moiety, and $(A)_n$ represents one or more polymerization activator moieties. The treated glass fibers may be combined with a resin to make a fiber-resin mixture. The resin may have a monomer and a catalyst. The monomer may be a lactam or lactone having 3-12 carbon atoms in the main ring. The catalyst in the resin may include a salt of lactam, and the salt may be an alkali metal salt or an alkali-earth metal salt. The fiber-resin mixture may then be cured so that the monomer polymerizes to form a polymer matrix of the fiber-reinforced composite.

At least one of the activator moiety, $(A)_n$ may comprise a $C_1$ to $C_9$ substituted or unsubstituted, organo-cyclic ring. The organo-cyclic ring may include at least one heteroatom that is a nitrogen or oxygen atom. The organo-cyclic ring may have the following formula:

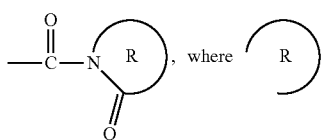

represents a $C_3$, to $C_{12}$, substituted or unsubstituted cyclic hydrocarbon chain. For example, R may be a $C_6$ hydrocarbon chain, so that activator moiety with an organo-cyclic ring has the formula:

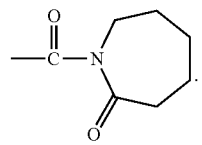

The linking moiety X may include an atom that connects X to one or more activator moieties $(A)_n$, where the atom is not a nitrogen atom.

The fiber-reinforced composite formed may be at least 60 wt. % glass fiber. The glass fiber content in the fiber-reinforced composite may range from about 60 wt. % to 90 wt. %. The glass fibers may comprise continuous glass fibers.

The fibers may be arranged as a mono-axial and/or multi-axial, woven and/or non-woven, continuous and/or chopped strand mat. The mats may have multiple sections with different weave styles, as well as combinations of woven and non-woven sections.

This technology may be used in a variety of processes such as resin transfer molding (RTM), reaction injection molding (RIM), reactive extrusion, filament winding, pultrusion, casting (including rotational casting), prepreg processes (including double belt press), rotational molding, blow molding, D-LFT processes, D-SMC processes, processes to produce organo sheets, and other types of prepregs (reactive and already reacted ones).

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings where like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Figure 1:
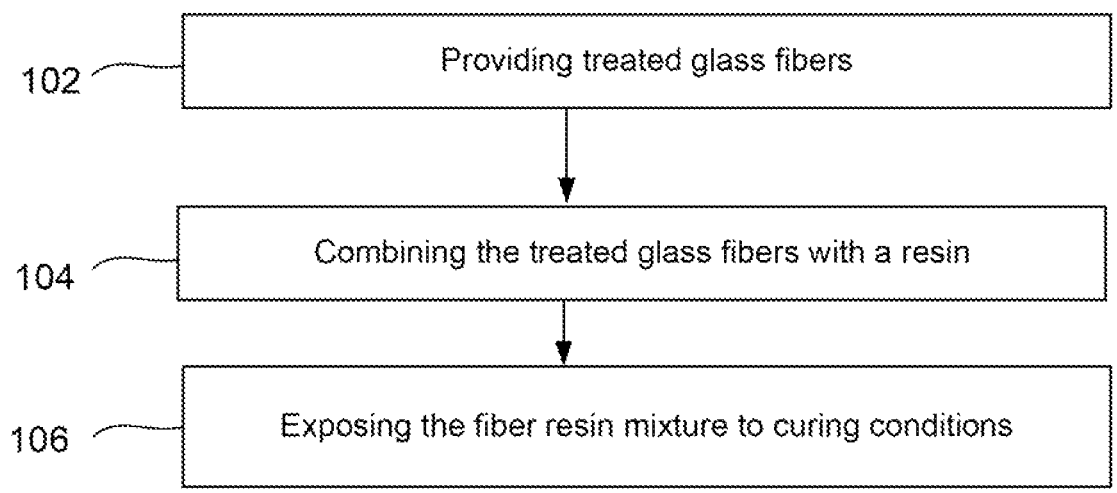
FIG. 1 shows a flowchart with selected steps in methods of making fiber-reinforced composite articles according to embodiments of the invention.

Embodiments of the invention that may include processes of making a fiber-reinforced composite are described. Methods described may help to increase the fiber weight percentage in composites. Continuous fibers may be used instead of chopped fibers at a high fiber content in the composite. The activator compounds may be added to both the resin and the fibers in a proportion adjusted to affect the mechanical properties in the fiber-reinforced composite. FIG. 1 shows selected operations in an exemplary method. Exemplary fibers used in the composites may include glass fibers, as shown in operation 102. These glass fibers may be treated with a sizing composition that has a coupling-activator compound with the formula: S—X-(A)$_n$, where S represents a silicon-containing coupling moiety capable of bonding to the surface of glass fibers, X represents a linking moiety, and (A)$_n$ represents one or more polymerization activator moieties. The treated glass fibers may be combined with a resin to make a fiber-resin mixture, as denoted by operation 104 in FIG. 1. The coupling-activator compound may start the polymerization of the surrounding monomer in close proximity to the fiber surface. The fiber-resin mixture may then be cured so that the monomer polymerizes to form a polymer matrix of the fiber-reinforced composite, as shown by operation 106 in FIG. 1. The fiber-reinforced composite formed may be at least 70 wt. % glass fiber.

The present technology is suitable for a variety of structural applications. The fiber-reinforced composite has high tensile strength and interlaminar shear strength. Such properties may make the fiber-reinforced composite suitable for wind turbine blades, for automotive applications, as well as for other applications in which shear stresses may overcome conventional composite structures.

This technology may be used in a variety of processes such as resin transfer molding (RTM), reaction injection molding (RIM), reactive extrusion, filament winding, pultrusion, casting (including rotational casting), prepreg processes (including double belt press), rotational molding, blow molding, D-LFT processes, D-SMC processes, processes to produce organo sheets, and other types of prepregs (reactive and already reacted ones).

Suitable X moieties may include any number of organic, semi-organic, or inorganic functional groups, and may include, for example, alkyl, aryl, and/or alkyl-aryl groups. The linking group X may be of any length, including null, in which case the activator (A)$_n$ would be directly attached to silicon-containing coupling moiety S. The linking moiety X may include an atom that connects X to one or more activator moieties (A)$_n$, where the atom is not a nitrogen atom. With the atom directly adjacent to the activator moiety (A)$_n$ not a nitrogen atom, the coupling-activator compound may be formed by a synthesis not using a precursor having an isocyanate functional group. The coupling-activator compound may be formed in a synthesis route that includes an ester group instead of an isocyanate group.

The silicon-coupling moiety S may have any of the known functional groups that react with the surface of an inorganic substrate (e.g., an organosilane group). Compounds containing organosilane groups as coupling agents in material systems may include an inorganic or organic phase, such as, for example, glass or polymer, respectively, and may serve to covalently bond the organic groups in the compound to groups on the inorganic surface. As one example, S may comprise an organosilane group of the following Formula II:

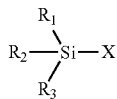

where X may be similar to X in Formula I above; and R$^1$, R$^2$, and R$^3$ may be the same or different and each may represent alkyl, aryl, alkoxy, halogen, hydroxy, or a cyclic structure where X is connected with one or more of R$^1$, R$^2$, and R$^3$.

The ring-opening polymerization activator moiety A may be any known organic reactive group that participates in a ring-opening polymerization reaction, which includes anionic ring-opening polymerization, cationic ring-opening polymerization, or ring-opening metathesis polymerization (ROMP). For example, such reactive group may participate in the polymerization by forming a reactive center where further cyclic monomers can join after opening to provide a larger polymer chain through ionic propagation.

The activator moiety (A)$_n$ may include a C$_1$ to C$_9$, substituted or unsubstituted, organo-cyclic ring. The organo-cyclic ring may have at least one heteroatom that is a nitrogen or oxygen atom. The organo-cyclic ring may have the following formula:

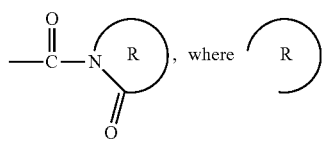

represents a C$_3$, to C$_{12}$, substituted or unsubstituted cyclic hydrocarbon chain. For example, R may be a C$_6$ hydrocarbon chain, so that activator moiety with an organo-cyclic ring has the formula:

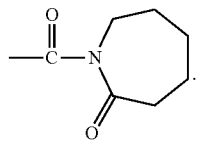

In another embodiment, the invention encompasses an inorganic substrate bonded to a coupling-activator compound of Formula I above. The inorganic substrate may include a plurality of glass fibers where at least one glass fiber is at least partially coated with the residue of a sizing composition comprising the coupling-activator compound. As previously described, the silicon-containing coupling moiety S of the coupling-activator compound that is included in the coated sizing composition may covalently bond to the glass fiber when the composition is coated and dried on the glass substrate, thereby securely attaching the coupling-activator compound to the glass substrate.

The ratio of the moles of the activator moiety on treated fibers to the moles of activator moiety in the resin may be between 0.02 and 20. This ratio may be adjusted to affect the mechanical properties in the fiber-reinforced composite. If too little coupling-activator compound is used on treated fibers, a low degree of covalent bonding between the fibers and the polymer matrix may result, leading to decreased strength of the composite. Strong covalent bonding between fibers and the polymer matrix created by the coupling-activator compound enhances the overall strength of the composite. However, if too much coupling-activator compound is used on treated fibers, too much bonding between the fibers and the polymer may reduce fracture toughness of the composite. In order to increase fracture toughness, less coupling-activator compound may be applied to the fibers. However, this decrease in the amount of coupling-activator on treated fibers may be offset by adding more activator in the resin. Thus, the ratio of the activator in the resin to the coupling-activator on the fiber may be adjusted to target a desired strength and fracture toughness of the final fiber-reinforced composite.

After the sizing has been applied, fibers may be collected in rovings. Glass fibers may include continuous glass fibers. Rovings of continuous sized strands may be used in some applications (e.g., in long-fiber thermoplastics) or the rovings may be commingled and may be later chopped to a desired length. Fiber-reinforced composites using continuous glass fibers may have higher mechanical strength in the final composite than with chopped fibers. Composites using continuous fibers and reactive resins can reach glass fiber weight percentages of around 90 wt. %.

Some embodiments of glass fibers according to the present invention may be particularly suited for reinforcing polyamide resins. Polyamide resins reinforced with glass fibers in accordance with the invention may include Nylon 6, Nylon 6:6, Nylon 6:12, Nylon 4:6, Nylon 6:10, Nylon 12, polyamide 6T (polyhexamethylene terephthalamide), polyamide 6I (polyhexamethylene isophthalamide) or mixtures thereof. In one embodiment, the A moiety of the coupling activator compound in formula I above may include a blocked precursor of the active activator moiety, e.g., a blocked isocyanate. In this embodiment, the precursor compound may be coated on the glass substrate and the active form of the activator may be generated in situ on the surface of a glass substrate when exposed to unblocking conditions. Non-limiting examples of glass fibers suitable for use in the present invention can include those prepared from fibersable glass compositions, such as "E-glass', "A-glass", "C-glass", "S-glass", "ECR-glass" (corrosion resistant glass), "T-glass", and fluorine and/or boron-free derivatives thereof.

Examples of other fibers include ceramic fibers (e.g., aluminum oxide, silicon carbide, silicon nitride, silicon carbide, basalt), carbon fibers (e.g., graphite, semi-crystalline carbon, carbon nanotubes), metal fibers (e.g., aluminum, steel, tungsten), and polymer fibers (e.g., aramid). The fibers may be arranged as a mono-axial and/or multi-axial, woven and/or non-woven, continuous and/or chopped strand mat. The mats may have multiple sections with different weave styles, as well as combinations of woven and non-woven sections. In addition, the mats may have regions where fibers are incorporated, for example to allow better wet out and resin penetration in a preselected part or parts of the composite article.

The resin may have a monomer, a catalyst, and an activator compound capable of initiating a polymerization of the monomer. The monomer may be a lactam or lactone having 3-12 carbon atoms in the main ring, such as caprolactam and caprolactone. The catalyst in the resin may include a salt of lactam, and the salt may be an alkali metal salt or an alkali-earth metal salt. The polymerization catalyst may be an alkali metal salt of the lactam or lactone monomer, such as sodium caprolactam and sodium caprolactone.

The fiber-resin mixture may then be cured to form a polymer matrix of the fiber-reinforced composite. The fiber-reinforced composite formed may be at least 70 wt. % glass fiber. The glass fibers in the fiber reinforced composite may range from about 70 wt. % to 90 wt. %, as compared to conventional composites limited to about 60 wt. % glass fiber. Higher weight percents of glass fiber result in a stronger composite.

There may also be other known auxiliary components in the polymerization mixture (e.g., co-activators, catalysts, co-catalysts, electron donors, accelerators, sensitizers, processing aids, release agents). The pre-polymerized mixture may also include partially polymerized compounds such as dimers, trimers, and/or oligomers.

When the combination of the pre-polymer lactam mixture and fibers is raised to the polymerization temperature, the ring structure may open or be otherwise activated to initiate a linear or branched polymerized chain from the activator moiety. The chain is coupled directly to the fiber through the coupling moiety and linking moiety trunk of the coupling-activator compound.

In an example where caprolactam is the monomer, the temperature of the pre-polymerized mixture may be raised from a melting temperature of between about 80° C. and 120° C., to a polymerization temperature of about 120° C. or more (e.g., about 120° C. to about 220° C.). In additional examples, the pre-polymerized mixture may have a melting temperature of about 80° C. to about 200° C. (e.g., about 100° C. to about 160° C.), and may have a polymerization temperature of about 120° C. to about 220° C. (e.g., about 180° C. to about 220° C.).

At least a portion of the polymer matrix formed by the polymerization of the lactam monomers is initiated by the activator moieties on the coupling-activator compounds bound to the treated fibers. These moieties may also start the formation of linear and/or branched polyamide polymers, the formation of which may also be aided by the one or more catalysts present. The coupling-activator compounds create covalent bonding between the surface of the fibers and the surrounding polymers that is significantly stronger than the bonding formed by simply curing a polyamide resin in the presence of untreated fibers.

The present polymer matrices may also include polymers that are not directly bonded to the treated fibers. These polymers may have been formed, for example, through polymerizations that were initiated from the activator compound in the resin or polymers that have fragmented or decoupled after polymerization was initiated at the fibers. Although these polymers may not be directly bonded to the fibers, their coulombic and physical interactions with the fiber surface-bonded polymers may further strengthen the bonding between the treated fibers and the surrounding polymer matrix.

Figure 2:
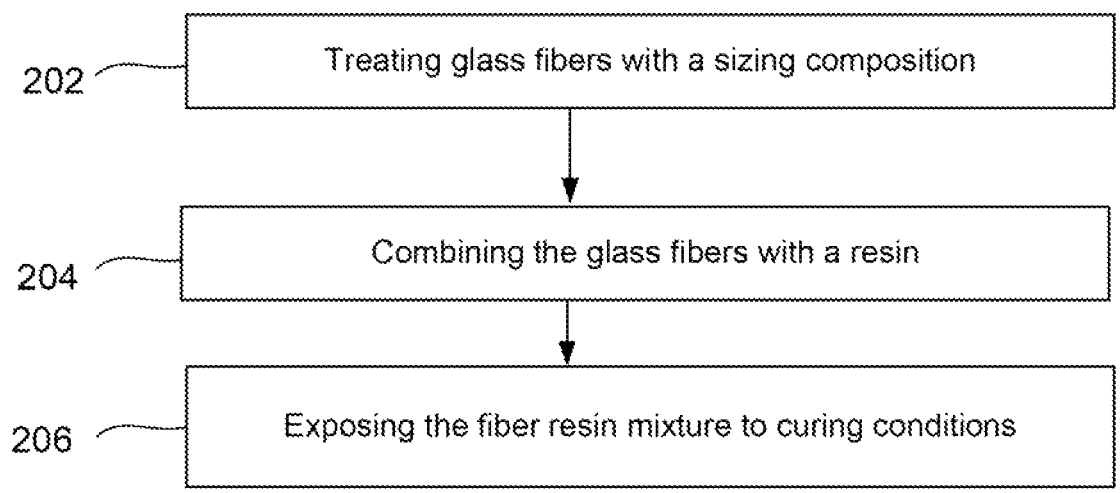
FIG. 2 shows a flowchart with selected steps in additional methods of making fiber-reinforced composite articles according to embodiments of the invention.

FIG. 2 illustrates the operations of forming fiber-reinforced composites according to the present technology. In operation 202, glass fibers may be treated with a sizing composition that has a coupling-activator compound with the formula: S—X—$(A)_n$, where S represents a silicon-containing coupling moiety capable of bonding to the surface of glass fibers, X represents a linking moiety, and $(A)_n$ represents one or more polymerization activator moieties. The S, X, and $(A)_n$ moieties may be any of the moieties discussed previously.

At least one of the activator moiety, $(A)_n$ may comprise a $C_1$ to $C_9$ substituted or unsubstituted, organo-cyclic ring. The organo-cyclic ring may include at least one heteroatom that is a nitrogen or oxygen atom. The organo-cyclic ring may have the following formula:

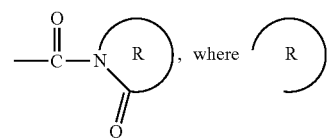

represents a $C_3$, to $C_{12}$, substituted or unsubstituted cyclic hydrocarbon chain. The organo-cyclic ring may include a $C_6$ hydrocarbon chain, such that the activator moiety has the formula:

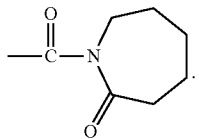

In operation 204 of FIG. 2, the treated glass fibers may be combined with a resin to make a fiber-resin mixture. The resin may have a monomer and a catalyst. The monomer may be a lactam or lactone having 3-12 carbon atoms in the main ring. The catalyst may be any of the catalysts previously disclosed above.

The fiber-resin mixture may then be cured so that the monomer polymerizes to form a polymer matrix of the fiber-reinforced composite, as in operation 206 of FIG. 2. Conditions for curing may include those disclosed above. The mechanisms for polymerization may include those previously discussed above.

The fiber-reinforced composite formed may be at least 60 wt. % glass fiber. The glass fibers in the fiber reinforced composite may range from about 60 wt. % to 90 wt. %. The glass fibers may comprise unchopped glass fibers or continuous glass fibers. The fibers may be any of the fibers previously discussed.

There may also be other known auxiliary components in the polymerization mixture (e.g., co-activators, catalysts, co-catalysts, electron donors, accelerators, sensitizers, processing aids, release agents). The pre-polymerized mixture may also include partially polymerized compounds such as dimers, trimers, and/or oligomers.

EXAMPLES

Example 1

Preparation of Woven Fabric Reinforcement 1,200 tex fiber glass rovings, which were treated with a sizing formulation containing a coupling-activator, 2-oxo-N-(3-(triethoxysilyl)propyl)azepane-1-carboxamide, were weaved to form a unidirectional fabric with the area weight of 670 g/m$^2$. A 6-layer 0/90° stack of the unidirectional woven fabric was then cut to 400 mm×400 mm and placed into the mold as reinforcement for the composite panel.

Example 2

Preparation of Woven Fabric-Reinforced Polyamide-6 Composite Panels

Two heated tanks were used for melting caprolactam-catalyst and caprolactam-activator separately. An amount of 1,000 grams of caprolactam (Brüggemann, AP Nylon grade) and 82.4 grams of Bruggolen C10 (Brüggemann, contains 17-19% sodium caprolactamate) were added to the first tank. This mixture of caprolactam and C10 was melted at 100° C. Separately, 1,000 grams of caprolactam (Brüggemann, AP Nylon grade) and 9.0 grams of Bruggolen C20 (Brüggemann, contains 80% caprolactam hexane di-isocyanate) were added to the second tank. This mixture of caprolactam and C20 was melted at 100° C.

The melts from the two tanks were then mixed at a 1:1 ratio in a static mixer, before the reactive mixture was injected into the mold. The reactive mixture in this example contains 0.6 mol % of active catalyst (sodium caprolactamate) and 0.1% mol of active activator (caprolactam hexane di-isocyanate).

After the reactive mixture was injected into the mold, the mold temperature was raised to 160° C. to form polyamide-6 in the presence of woven fabric reinforcement. The resulting panels have a glass content of 65% by weight and a thickness of 3.5 mm.

Test Methods

1. Tensile Strength

Tensile strength of the composite samples was tested based on ISO 527-3 standard (Type 2 sample). A gauge length of 150 mm and a testing speed of 2 mm/min were used for testing. For each composite panel, eight samples of 250 mm in length and 25 mm in width were cut for tensile tests.

2. Interlaminar Shear Strength (ILSS)

ILSS tests were conducted based on ASTM 2344 standard. A span length of 12 mm and a testing speed of 1 mm/min were used for testing. For each composite panel, 10 samples of 40 mm in length and 6 mm in width were cut for ILSS tests.

3. Flexural Strength

Flexural strength tests were conducted based on ISO 178 standard. A span length of 48 mm and a testing speed of 1 mm/min were used for testing. For each composite panel, 10 samples of 60 mm in length and 25 mm in width were cut for flexural strength tests.

TABLE 1

| | | | Test results | | | | | |
|---|---|---|---|---|---|---|---|---|
| | C20 | C10 | Tensile Strength (MPa) | | Interlaminar Shear Strength (MPa) | | Flexural Strength (MPa) | |
| Panel # | (mol %)* | (mol %)* | Ave | STDev | Ave | STDev | Ave | STDev |
| 1 | 0.10 | 0.60 | 271.8 | 31.6 | 63.4 | 13.2 | 202.0 | 28.3 |
| 2 | 0.15 | 0.60 | 274.2 | 25.1 | 71.3 | 10.1 | 377.7 | 44.3 |
| 3 | 0.21 | 0.60 | 316.7 | 21.6 | 82.8 | 10.6 | 441.9 | 23.4 |
| 4 | 0.30 | 0.60 | 299.5 | 38.8 | 71.5 | 14.9 | 434.5 | 37.2 |

*mole percent relative to caprolactam

Table 1 shows the mechanical properties of the composite panels, produced with the same woven fabric reinforcement but different reactive resins containing various amount of unbonded activator (C20) in the resin. By adjusting the amount of activator (C20) in the resin, the ratio of the glass surface-bonded activator to the unbonded activator in the resin can be optimized to maximize the composite mechanical properties. For example, the mechanical properties, including tensile, ILSS, and flexural strengths of the composite panel #3 are the highest among all four panels, indicating an optimal ratio of glass surface-bonded activator to unbonded activator in the resin.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the fiber" includes reference to one or more fibers and equivalents thereof known to those skilled in the art, and so forth.

What is claimed is:

1. A method to make a fiber-reinforced composite, the method comprising:
    providing treated glass fibers treated with a sizing composition that has a coupling-activator compound with the formula:

wherein n is an integer having a value between 1 and 5;
    S comprises a silicon-containing coupling moiety through which the coupling-activator compound bonds to a surface of the glass fibers;
    X comprises a linking moiety to link the S moiety with one or more A moieties; and
    $(A)_n$ comprises one or more polymerization activator moieties, wherein each of the activator moieties is capable of initiating a polymerization of the monomer, and wherein each of the activator moieties is the same or different;
    combining the treated glass fibers with a resin to make a fiber-resin mixture, wherein the resin comprises a monomer, a catalyst, and an activator compound capable of initiating a polymerization of the monomer, and wherein the monomer is a lactam or lactone having 3-12 carbon atoms in the main ring, and further wherein moles of the activator compound in the resin are 10% to 50% of moles of the polymerization activator moieties on the treated glass fibers; and
    exposing the fiber-resin mixture to curing conditions where the monomer polymerizes to form a polymer matrix of the fiber-reinforced composite;
    wherein the fiber-reinforced composite is at least 70 wt. % glass fiber.

2. The method of claim 1, wherein the fiber-reinforced composite is 70 wt. % to 90 wt. % glass fiber.

3. The method of claim 1, wherein the glass fibers comprise continuous glass fibers.

4. The method of claim 1, wherein the at least one of the activator moieties $(A)_n$ comprises a $C_1$ to $C_9$, substituted or unsubstituted, organo-cyclic ring.

5. The method of claim 4, wherein the organo-cyclic ring of the activator moiety comprises at least one heteroatom selected from the group consisting of nitrogen and oxygen.

6. The method of claim 4, wherein the organo-cyclic ring of the activator moiety has the formula:

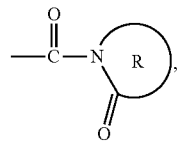

wherein

represents a $C_3$, to $C_{12}$, substituted or unsubstituted cyclic hydrocarbon chain.

7. The method of claim 4, wherein the organo-cyclic ring of the activator moiety has the formula:

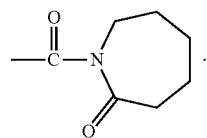

8. The method of claim 1, wherein the n in $(A)_n$ has an integer value of 2 to 5.

9. The method of claim 1, wherein the linking moiety X comprises an atom that connects X to one or more activator moieties $(A)_n$ wherein the atom is not a nitrogen atom.

10. The method of claim 1, wherein the treated glass fibers are arranged into woven fabrics, multi-axial fabric, continuous strand mats, chopped strand mats, or combinations thereof.

11. The method of claim 1, wherein the method is used in a process of producing composite articles selected from the group consisting of resin transfer molding (RTM), reaction injection molding (RIM), pultrusion, filament winding, casting, and prepreg processes.

12. A method to make a fiber-reinforced composite, the method comprising:
    treating glass fibers with a sizing composition that has a coupling-activator compound with the formula:

wherein n is an integer having a value between 1 and 5;
    S comprises a silicon-containing coupling moiety through which the coupling-activator compound bonds to a surface of the glass fibers;
    X comprises a linking moiety to link the S moiety with one or more A moieties; and (A)$_n$ comprises one or more polymerization activator moieties, wherein each of the activator moieties is capable of initiating a polymerization of the monomer, and wherein each of the activator moieties is the same or different;

combining the glass fibers with a resin to make a fiber-resin mixture, wherein the resin comprises a catalyst, a monomer, and an activator compound capable of initiating a polymerization of the monomer, wherein the monomer is a lactam or lactone having 3-12 carbon atoms in the main ring, and wherein moles of the activator compound in the resin are 10% to 50% of moles of the polymerization activator moieties on the treated glass fibers; and exposing the fiber-resin mixture to curing conditions where the monomer polymerizes to form a polymer matrix of the fiber-reinforced composite;

wherein the fiber-reinforced composite is at least 60 wt. % glass fiber.

13. The method of claim 12, wherein the fiber-reinforced composite is 60 wt. % to 90 wt. % glass fiber.

14. The method of claim 12, wherein the glass fibers comprise continuous glass fibers.

15. The method of claim 12, wherein the at least one of the activator moieties (A)$_n$ comprises a $C_1$ to $C_9$, substituted or unsubstituted, organo-cyclic ring.

16. The method of claim 15, wherein the organo-cyclic ring of the activator moiety comprises at least one heteroatom selected from the group consisting of nitrogen and oxygen.

17. The method of claim 15, wherein the organo-cyclic ring of the activator moiety has the formula:

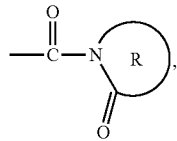

wherein

represents a $C_3$, to $C_{12}$, substituted or unsubstituted cyclic hydrocarbon chain.

18. The method of claim 15, wherein the organo-cyclic ring of the activator moiety has the formula:

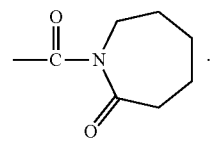

19. The method of claim 12, wherein the n in (A)$_n$ has an integer value of 2 to 5.

20. The method of claim 12, wherein the linking moiety X comprises an atom that connects X to one or more activator moieties (A)$_n$, wherein the atom is not a nitrogen atom.

21. The method of claim 12, wherein the treated glass fibers are arranged into woven fabrics, multi-axial fabric, continuous strand mats, chopped strand mats, or combinations thereof.

22. The method of claim 12, wherein the method is used in a process of producing composite articles selected from the group consisting of resin transfer molding (RTM), reaction injection molding (RIM), pultrusion, filament winding, casting, and prepreg processes.

* * * * *